(12) United States Patent
Bolignano

(10) Patent No.: US 11,074,372 B2
(45) Date of Patent: Jul. 27, 2021

(54) SMARTPHONE OR TABLET HAVING A SECURE DISPLAY

(71) Applicant: PROVE & RUN, Paris (FR)

(72) Inventor: Dominique Bolignano, Paris (FR)

(73) Assignee: PROVENRUN, Paris (FR)

( * ) Notice: Subject to any disclaimer, the term of this patent is extended or adjusted under 35 U.S.C. 154(b) by 337 days.

(21) Appl. No.: 15/511,768

(22) PCT Filed: Sep. 22, 2015

(86) PCT No.: PCT/FR2015/000187
§ 371 (c)(1),
(2) Date: Mar. 16, 2017

(87) PCT Pub. No.: WO2016/046458
PCT Pub. Date: Mar. 31, 2016

(65) Prior Publication Data
US 2017/0293776 A1   Oct. 12, 2017

(30) Foreign Application Priority Data

Sep. 22, 2014  (FR) ...................... 1402124

(51) Int. Cl.
*G06F 21/84* (2013.01)
*G06F 21/36* (2013.01)
*G06F 21/62* (2013.01)

(52) U.S. Cl.
CPC ............. *G06F 21/84* (2013.01); *G06F 21/36* (2013.01); *G06F 21/6218* (2013.01)

(58) Field of Classification Search
CPC .............. G06F 21/36; G06F 21/70–72; G06F 21/82–88; G06F 21/62; G06F 21/6218; G06F 21/6209; G06F 21/602
(Continued)

(56) References Cited

U.S. PATENT DOCUMENTS 4,882,779 A * 11/1989 Rahtgen ................ G07F 7/1016
705/72
5,345,250 A * 9/1994 Inoue .................... G09G 3/3629
345/100
(Continued)

FOREIGN PATENT DOCUMENTS

EP      1 788 507 A2    5/2007
EP      1788507 A2 *    5/2007    ............. G06F 21/53
(Continued)

OTHER PUBLICATIONS

International Search Report and Written Opinion dated Dec. 16, 2015 issued in corresponding application No. PCT/FR2015/000187; w/ English partial translation and partial machine translation (19 pages).

*Primary Examiner* — Noura Zoubair
*Assistant Examiner* — Mahabub S Ahmed
(74) *Attorney, Agent, or Firm* — Seckel IP, PLLC

(57) ABSTRACT

A secure terminal, particularly for protecting smartphones or tablets, includes: a display system including a screen and a graphical component for carrying out commands to display visual data on the screen; a central processing unit for carrying out executable program instructions and sending display commands to the display system; and a communication device connecting the central processing unit to the display system; a security processor for securely interpreting and/or processing display commands of secure visual data on the screen; a communication device connecting the security processor to the display system; and a means for visual recognition, by a user of the terminal, of a secure mode for displaying the secure visual data, which is displayed on the screen when the secure visual data is displayed, and is controlled by the security processor.

24 Claims, 3 Drawing Sheets

(58) Field of Classification Search
USPC .......................................................... 726/28
See application file for complete search history.

(56) References Cited

U.S. PATENT DOCUMENTS

| | | | | |
|---|---|---|---|---|
| 5,970,146 | A * | 10/1999 | McCall | G06F 3/0416 345/173 |
| 6,022,274 | A * | 2/2000 | Takeda | A63F 13/02 463/44 |
| 6,092,202 | A * | 7/2000 | Veil | G06F 21/34 705/64 |
| 6,549,194 | B1 * | 4/2003 | McIntyre | G06F 21/6218 345/173 |
| 6,630,928 | B1 * | 10/2003 | McIntyre | G06F 3/04886 345/173 |
| 6,931,151 | B2 * | 8/2005 | Weast | G06T 11/001 345/589 |
| 7,302,585 | B1 * | 11/2007 | Proudler | G06F 21/84 713/189 |
| 7,474,312 | B1 * | 1/2009 | Rohrer | G06F 3/14 345/530 |
| 7,526,785 | B1 * | 4/2009 | Pearson | G06F 21/57 725/31 |
| 8,176,324 | B1 * | 5/2012 | Krishnamurthy | G06F 3/04812 713/168 |
| 8,201,262 | B2 * | 6/2012 | Matsuo | H04N 21/25808 726/27 |
| 8,245,307 | B1 * | 8/2012 | Pharris | H04L 9/3234 726/27 |
| 8,261,064 | B2 | 9/2012 | Ditzman et al. | |
| 8,373,708 | B2 * | 2/2013 | Parikh | G06F 21/85 345/502 |
| 8,448,251 | B2 | 5/2013 | Harris et al. | |
| 8,814,681 | B2 * | 8/2014 | Wells | G07F 17/3241 463/31 |
| 8,925,103 | B2 * | 12/2014 | Kim | G06F 21/71 726/27 |
| 9,021,261 | B2 * | 4/2015 | Ditzman | G06F 21/84 713/167 |
| 9,165,128 | B1 * | 10/2015 | Daniel | G06F 21/10 |
| 9,178,981 | B2 * | 11/2015 | Cho | H04W 12/086 |
| 9,245,129 | B2 * | 1/2016 | Gupta | G06F 21/60 |
| 9,262,649 | B2 * | 2/2016 | Berlin | G06K 19/0723 |
| 9,507,961 | B2 * | 11/2016 | Zeng | G06F 21/74 |
| 9,723,000 | B1 * | 8/2017 | Daniel | H04L 63/0876 |
| 2003/0004896 | A1 * | 1/2003 | Watlington | G07F 19/201 705/72 |
| 2003/0048306 | A1 * | 3/2003 | Owhadi | G09G 5/393 715/781 |
| 2003/0108198 | A1 * | 6/2003 | Lahiri | G06F 21/84 380/54 |
| 2003/0191967 | A1 * | 10/2003 | Naccache | G06F 21/36 726/21 |
| 2005/0015794 | A1 * | 1/2005 | Roelens | H04N 21/4305 725/18 |
| 2005/0091486 | A1 * | 4/2005 | Avraham | G06F 21/84 713/162 |
| 2005/0166064 | A1 * | 7/2005 | Dive-Reclus | H04M 1/72403 713/189 |
| 2006/0158464 | A1 * | 7/2006 | Bhattacharjya | G06F 21/608 345/644 |
| 2006/0184785 | A1 * | 8/2006 | Challener | G06F 21/85 713/151 |
| 2007/0050849 | A1 * | 3/2007 | Takashima | G11B 20/00362 726/26 |
| 2007/0291303 | A1 * | 12/2007 | Tanaka | H04N 1/00474 358/1.15 |
| 2008/0209212 | A1 * | 8/2008 | Ditzman | G06F 21/84 713/167 |
| 2008/0246774 | A1 * | 10/2008 | Yadav | G06F 21/10 345/522 |
| 2009/0254986 | A1 * | 10/2009 | Harris | G06F 21/74 726/17 |
| 2010/0228994 | A1 * | 9/2010 | Kang | G06F 21/83 713/189 |
| 2010/0235622 | A1 * | 9/2010 | Robinton | G06F 21/82 713/153 |
| 2012/0239916 | A1 * | 9/2012 | Malasani | H04W 12/50 713/1 |
| 2012/0260307 | A1 * | 10/2012 | Sambamurthy | G06F 21/60 726/1 |
| 2013/0091583 | A1 * | 4/2013 | Karroumi | G06F 3/04886 726/26 |
| 2013/0103190 | A1 * | 4/2013 | Carapelli | G07F 9/006 700/237 |
| 2013/0111219 | A1 * | 5/2013 | Avanch | G06F 21/84 713/189 |
| 2013/0191925 | A1 | 7/2013 | Ditzman et al. | |
| 2013/0275306 | A1 * | 10/2013 | Ignatchenko | G06F 21/84 705/44 |
| 2014/0040633 | A1 * | 2/2014 | Leleu | G06F 21/606 713/189 |
| 2014/0053262 | A1 * | 2/2014 | Sarangdhar | H04L 63/145 726/22 |
| 2014/0164782 | A1 * | 6/2014 | Lo | H04W 12/12 713/184 |
| 2014/0181964 | A1 * | 6/2014 | Park | G06F 21/6209 726/19 |
| 2014/0279561 | A1 * | 9/2014 | Carapelli | G07F 19/2055 705/71 |
| 2014/0351739 | A1 * | 11/2014 | Leger | G06F 3/04886 715/773 |
| 2014/0366127 | A1 * | 12/2014 | DeLuca | G06F 21/36 726/19 |
| 2015/0220760 | A1 * | 8/2015 | Foote | G06F 21/84 345/32 |
| 2015/0254622 | A1 * | 9/2015 | Matsumoto | G07F 7/0886 705/16 |
| 2015/0264044 | A1 * | 9/2015 | Li | H04L 9/3234 726/9 |
| 2015/0287031 | A1 * | 10/2015 | Radu | G06Q 20/20 705/18 |
| 2016/0020906 | A1 * | 1/2016 | Nolte | G06Q 20/4012 705/71 |
| 2017/0039401 | A1 * | 2/2017 | Naccache | G06Q 20/352 |
| 2019/0236299 | A1 * | 8/2019 | Son | A61B 5/02438 |

FOREIGN PATENT DOCUMENTS

| | | | | |
|---|---|---|---|---|
| EP | | 2363824 A1 * | 9/2011 | ............ G06Q 30/06 |
| EP | | 2775421 A1 * | 9/2014 | ............ H04L 63/083 |
| WO | | 2008/106400 A2 | 9/2008 | |

* cited by examiner

SMARTPHONE OR TABLET HAVING A SECURE DISPLAY

FIELD OF THE INVENTION

This invention relates to a secure smartphone or tablet comprising: —a screen for the display of visual data; —a display subsystem for the controlling of the displaying of visual data on said screen; —a central processing unit for carrying out executable program instructions and sending display commands to the display subsystem; and—a communication device connecting the central processing unit to the display subsystem. It further relates to a method for securing the display of such a smartphone or tablet.

PRIOR ART

In the field of computer security, so-called trustworthy codes are distinguished from those that are not trustworthy.

A code is said to be trustworthy when the user/the developer is confident that the code executed complies with a security policy or a specification that generally constrains/limits the behavior authorized. For example, the trustworthy code is verified by formal methods that guarantee that its operation is compliant with the specifications.

A code is not trustworthy in the other cases. It can then behave in a manner that is not compliant with what it is supposed to do or with what is expected. This can occur either because the code is poorly written or written by actors who cannot be trusted, or because it is corrupted, or even, incorrectly configured. But this can also be the case if information is missing about the code itself, or the manner with which it was developed.

In a security context, in the presence of a code that is not trustworthy, a pessimistic attitude is generally assumed by supposing that the code in question can make use of all of the means that it has to do the worst.

In the same way, a communication channel is said to be secure if it is physically secure, or if it is secured virtually. The communication channel is physically secure if it is secured by a physical control. This concept is similar to that of the trustworthy code by considering that the channel is a computer function. And a communication channel is virtually secure if it uses a cryptographic protocol that provides certain elements of security. For example, a VPN (Virtual Private Network) is a virtually secure channel.

Smartphones and tablets are modern terminals, which are generally open. They can load applications and data from diverse sources and which are not trustworthy. This can result in attacks, in particular software attacks, able to corrupt the operating system of the terminal by taking advantage for example of flaws in this system, in particular implementation, design, configuration, or manipulation errors.

However, it is useful to be able to trust telephones/tablets at least at particular moments, for example, during phases of financial transactions, signing, or when confidential data is being keyed in. In particular, it is important that the user of the telephone be certain that "what he signs is identical to what he sees" on the screen of his terminal. For example, when entering a secret, such as a PIN code (Personal Identification Number), the user must be certain that he enters his code in a framework that is trustworthy and that the confidentiality of this code is guaranteed. In another example, when the user approves a financial transaction viewed on the screen of his terminal, he must be certain that the amount that is displayed is the actual amount for which he is giving his approval.

In practice, when a user desires to consult his bank account on the Internet by means of his smartphone, he executes a banking application and dialogues with this application using a screen and a keyboard that is generally virtual. In a first step, the banking application identifies the user by prompting the latter to enter the customer number. The user then enters his customer number using the keyboard. In a second step, the banking application authenticates the customer user by prompting the latter to enter his secret access code using the keyboard. If the identification and the authentication are validated by the banking application, then the latter displays the state of the account of the user on the screen.

Such man/machine interactions are subject to many malicious attacks. For example, some of these attacks consist in recovering the identifier and the secret access code of the customer user so that the hacker can consult at his leisure the accounts of the customer user in particular to carry out illicit bank transfers.

An attack technique consists in taking control of the output peripheral devices of the interface and, in particular, in taking control of the display of the screen, for example, by taking control of the central processing unit of the terminal, and emulating or simulating the banking application. The customer user, who believes that he is using the genuine banking application, supplies his identifiers and access codes to the malicious application. These identifiers and codes are recovered for fraudulent use.

Of course, it has been imagined, in the field of payment terminals, to have terminals comprising an additional controller, such as is the case in document EP1788507. However, this is not tablets or telephones, and in no case, the additional controller filters the display commands sent by the controller to the display system.

In light of the above, a problem that the invention proposes to resolve is to provide a smartphone or tablet that guarantees certain security properties during certain phases of interaction without having to trust the processor, its operating system and its applications.

SUMMARY OF THE INVENTION

The solution of the invention to this problem has for first object a secure smartphone or tablet comprising:
  a screen for the display of visual data;
  a display subsystem for the controlling of the display of visual data on said screen;
  a central processing unit for carrying out executable program instructions and sending display commands to the display subsystem;
  a communication device connecting the central processing unit to the display subsystem;
  characterized in that it further comprises:
  a security processor for interpreting and/or processing security commands for a secure display of secure visual data on said screen, said security processor filtering the display commands sent by the central processing unit and intended to be processed by display subsystem; and
  a means for recognizing, by a user of the telephone or tablet, of a secure mode for displaying the secure visual data when said secure visual data, of which the display is controlled by the security processor, is displayed.

Advantageously, —the security processor interprets and/ or processes the security commands and controls the display of secure visual data in the secure mode for displaying the secure visual data; —the security commands sent to the security processor are signed commands, which guarantee the integrity and/or the authentication of the secure data displayed; —the security commands sent to the security processor are encrypted or scrambled commands that guarantee the confidentiality of the secure data displayed; —the security processor manages several security areas, as well as the corresponding means of visual recognition; and—display subsystem comprises at least one main frame buffer and the security processor comprises a security frame buffer.

The solution of the invention has for second object a method for securing the display of visual data by means of a smartphone or tablet such as defined hereinabove, characterized in that it comprises the following steps according to which:

the central processing unit processes executable program instructions and sends display commands to the display subsystem by the communication device connecting the central processing unit to the display subsystem;

the display commands sent to the display subsystem by the central processing unit are filtered by the security processor;

the security processor controls a secure display of the secure data; and the security processor controls the means of recognizing the secure mode for displaying the secure visual data.

Advantageously, —the security commands are signed, guaranteeing the integrity and/or the authentication of the secure data displayed; —the security commands are scrambled or encrypted, guaranteeing the confidentiality of the data displayed; the security processor manages several security areas, as well as the corresponding means of visual recognition; —the means for recognizing is a means for visual recognition displayed on the screen; —and display subsystem comprises at least one main frame buffer and in that the security processor comprises a security frame buffer and in that the security processor is the only one to write in the security frame buffer.

The invention makes it possible to trust only the display system when it displays, in a secure mode, and the secure application located for example on a server or on a secure component, for example a chip card, or even a secure zone of the processor, for example a zone of the type of zone named TrustZone™ from the company ARM™, which prepares for it the information to be displayed or to be entered in a secure manner. The other components of the telephone or tablet can play a functional role. This for example entails relaying the messages, but without them having to be trusted.

BRIEF DESCRIPTION OF THE FIGURES

The invention shall be better understood when reading the following non-limiting description, written with respect to the annexed drawings, wherein.

DETAILED DESCRIPTION OF THE INVENTION

Figure 1:
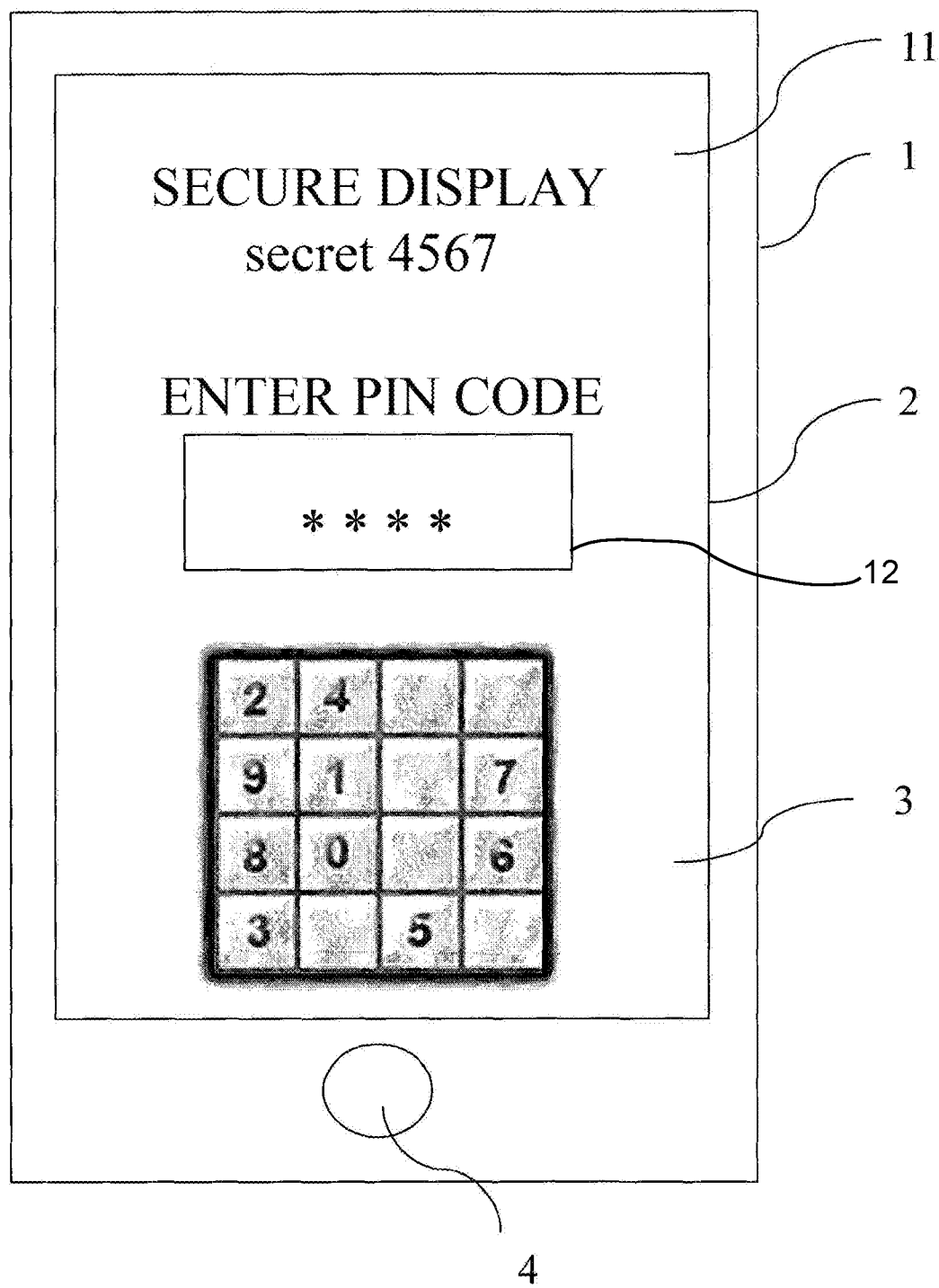
FIG. 1 shows, diagrammatically, a telephone according to the invention, provided with a screen and displaying the secure display mode of the secure data.

This invention relates to a smartphone or a tablet, which are terminals. A smartphone is shown in FIG. 1. In this figure, it is referenced as 1. This is a portable smartphone.

The telephone 1 is provided with a screen 2. On this screen 2, in the aforementioned FIG. 1, a secure display zone is shown comprising a secure entry zone for data, as well as a virtual keyboard 3. This virtual keyboard 3 is for example a digital keyboard with randomly-positioned keys. A button 4 makes it possible for example to exit the secure display mode of the data.

Figure 2:
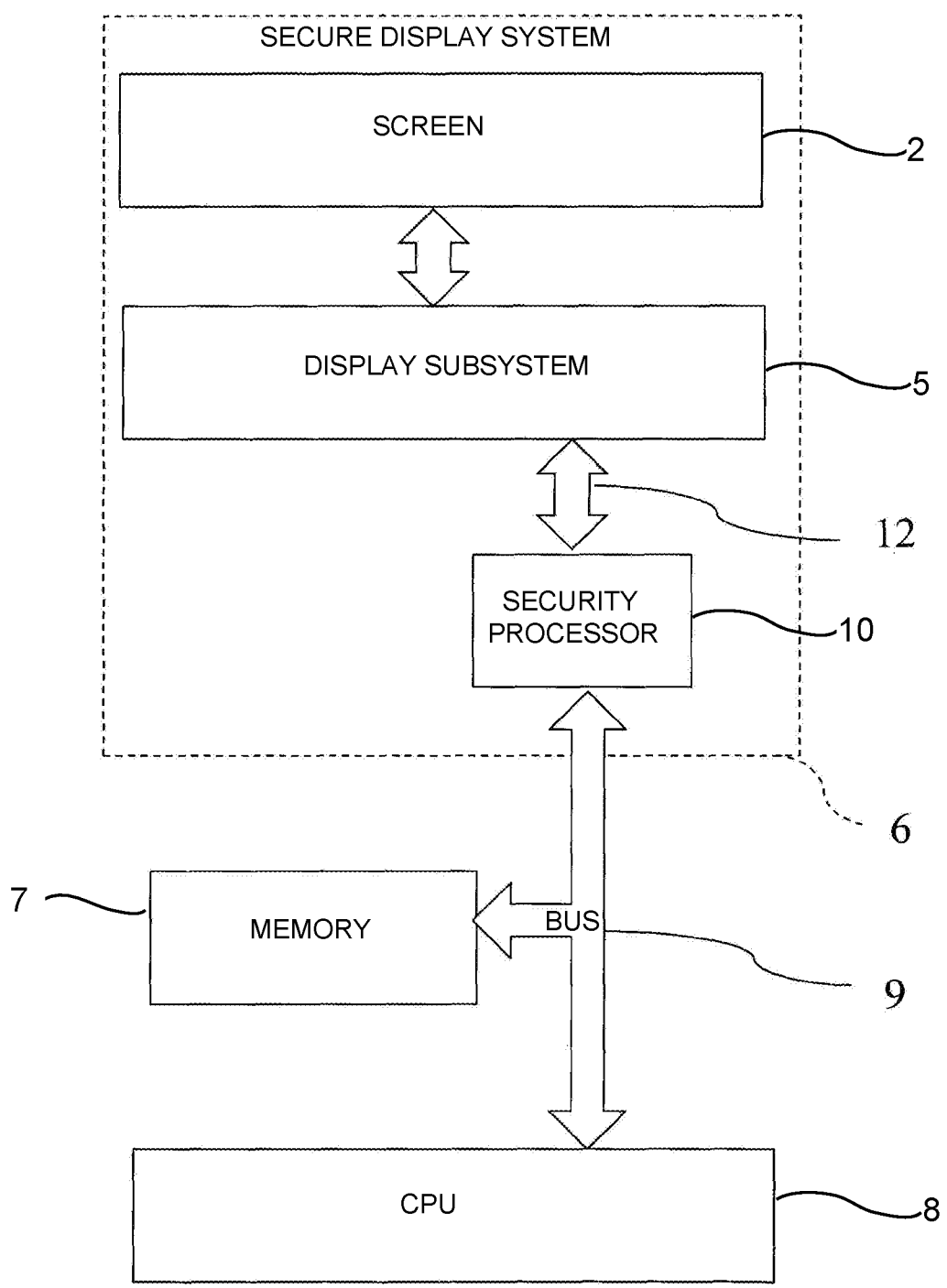
FIG. 2 shows, diagrammatically, the hardware means implemented in the secure telephone of the invention, for the securing of the display.
Figure 3:
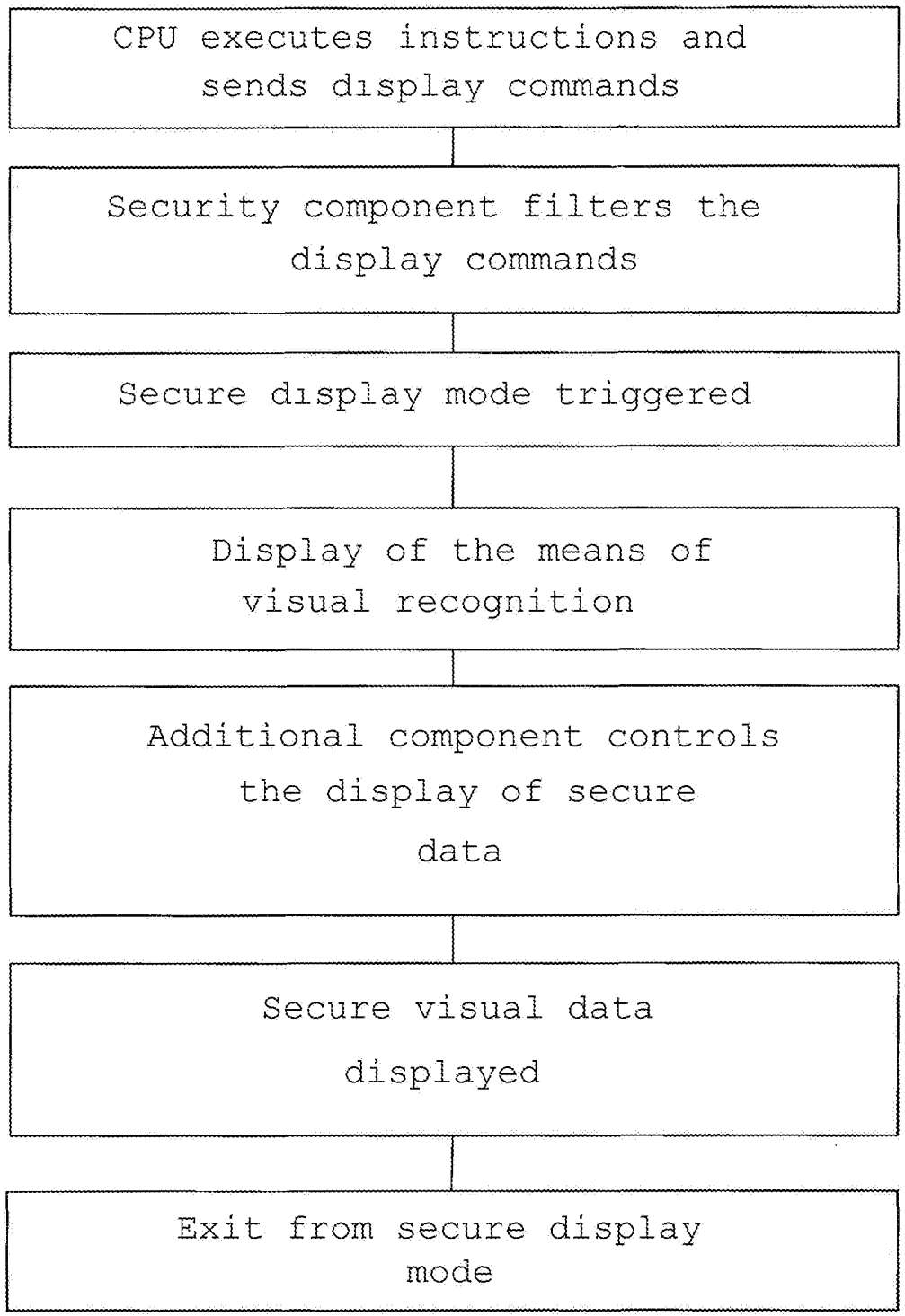
FIG. 3 is a diagram that shows the various steps in the method for securing according to the invention.

As shown in FIG. 2, the secure telephone 1 according to the invention comprises a display subsystem 5. The display subsystem 5 comprises one or several components. It controls the screen 2. To this effect, it recovers the information that forms the images contained for example in a memory zone of a frame buffer, converts this information and controls the display of the images on the screen 2. For the display, display subsystem 5 executes display commands that are sent to it. In this description, in the case where the telephone 1 comprises a frame buffer, it is considered that this telephone 1 comprises at least one so-called main frame buffer and, possibly, at least one so-called security frame buffer. The main frame buffer is considered to be a part of the display subsystem 5.

According to the invention, display subsystem 5 is supplemented by a security processor 10 in order to form, with the screen 2, a secure display system 6. Thanks to this secure processor 10, the secure display system 6 is able to manage several display modes, with at least one of these modes being a secure display mode. When the secure display system 6 receives a security command, for example a command containing a security parameter, this command is analyzed and processed by the security processor 10 and potentially used to control display subsystem 5, or to update the data of the security processor 10. Otherwise, this command is directly transmitted to the display subsystem 5 which interprets this command, composes visual data, in particular image data, and displays this visual data on the screen 2 according to the command that is sent to it. The display commands received by display subsystem 5 are therefore able to come from the security processor 10 or from the central processing unit 8.

The telephone further comprises at least one memory 7. This memory 7 is for example a Flash memory. Applications and data are recorded in the memory 7. This can be applications that require a high level of security, such as banking applications, which allow a user to access his accounts online and to carry out financial transactions. It can be malicious applications or comprise corrupted code, which jeopardizes the security of the telephone 1 and the secrets entered or displayed on the screen 2.

The central processing unit 8, or CPU (Central Processing Unit), is the central component of the terminal, that executes the instructions of executable software programs which are contained in a memory of the telephone 1 or which are sent to it by peripheral devices, for example by the keyboard 3. It executes these instructions and sends display commands to the secure display system 11, in particular, to the display subsystem 5 when the latter can be accessed directly.

The telephone 1 moreover comprises a communication device 9 that connects the central processing unit 8 to the secure display system 11. This communication device 9 is conventionally a bus system, which conveys the display commands to the display subsystem 5 directly or indirectly.

The telephone 1 further comprises, according to the invention, the security processor 10. This security processor 10 is a hardware component. It can be physically independent from the other components of the telephone 1, i.e. form an independent physical entity and which can be distinguished from the other components. It can also not be physically independent from other components of the telephone. For example, it can be physically independent from the central processing unit 8 or at least partially linked or incorporated into this unit. In the case where it is at least partially linked to the unit 8, this is a security coprocessor of this unit. In certain alternative embodiments of the invention, it is integrated into the display subsystem 5, i.e. into one of its components, in a way that no longer makes it possible to distinguish the two and/or which suppresses the need for an additional communication device between the processor 10 and display subsystem 5. Alternatively, the security processor 10 can be placed on the communication channel between display subsystem 5 and the central processing unit 8 as long as it is given the means to control at least partially display subsystem 5, for example, by giving it direct and exclusive access to certain commands of the display subsystem 5.

This security processor 10 fulfils various functions. It filters the display commands transmitted in particular by the central processing unit 8 to the display subsystem 5. The processor receives these display commands, and decides whether or not to take action. It therefore acts as an arbitrator. The filtered commands are in particular display commands, which stem from the execution of trustworthy applications and require a high degree of security, and which are transmitted by the control unit 8 to the display subsystem 5. The security processor 10 interprets the display commands and, in particular, the aforementioned commands, which will be called security commands, executes them in a secure framework, and in particular manages the secure display mode. It checks that the security commands that it filters comply with the security policies that must be respected. It conducts security verifications and alone controls, without intervention from the central processing unit 8, display subsystem 5 when it triggers a so-called secure display mode. To this effect, it maintains a state comprising a representation of the secure visual data to be displayed and information indicating if this secure visual data is to be displayed or not. The security processor 10 is advantageously associated with one or several encryption keys, in particular a private key and/or a public key, which allows it to authenticate or check the integrity, of the security commands that it receives. The security commands are, in an example, identical to the conventional display commands which are transmitted by the central processing unit 8 to the display system 5, but further comprise security parameters such as a digital signature, for example in the terminal portion of the command. This is in particular, but not exclusively, data description commands, including the reset (RAZ) command, display commands and end-of display. The security processor 10 has means for verifying the authenticity and/or the signature of the commands that it receives.

The telephone 1 comprises a communication device 12, that connects the security processor 10 to the display subsystem 5. This communication device 12 is conventionally a bus system, which conveys the secure display commands to the display subsystem 5. The communication device 12 and the communication device 9 can form the same bus system. The communication device 12 can however be a device dedicated solely to the transmission of secure display commands to the display subsystem 5. It may not exist in the case where the two components or subsystems 5 and 10 are integrated into the same component. A portion of the functionalities of the security processor 10 can also be integrated into the display subsystem 5 while still leaving another portion in a separate component or subsystem. For example, display subsystem 5 can be provided with a particular input that can be accessed solely by the security processor 10, for example, through a direct physical connection, and which makes it possible to block certain commands sent to the display subsystem 5. This makes it possible indeed for the security processor 10 to filter the commands sent to the display subsystem 5 without having itself to relay the unmodified commands, for example the non-secure display commands, which could be penalizing from a performance standpoint.

The smartphone 1 comprises finally a means for recognizing, for example visual, by a user of said terminal, of the secure mode for displaying the secure visual data. This means for visual recognition is in particular a mark visible on the screen 2 that indicates the secure display mode. It can however be another means of recognition, for example, a colored light displayed on the telephone by means of a LED (Light Emitting Diode), or even a characteristic vibration of the telephone. In FIG. 1, this means of recognition is referenced as 11. It entails the words "SECURE DISPLAY/ secret 4567" with 4567 representing a secret which is known only to the user and to the security processor 10, but not to the components which are not deemed as trustworthy, for example, the central processing unit and its applications. The allows the user to recognize the window without any ambiguity as being a security display, as the applications or components that are not trustworthy are incapable of constituting such a window. Indeed, only the security processor 10 has the capacity to do this. This therefore forms a means for visual recognition 11 which is displayed on the screen 2 when the secure visual data, under the control of the security processor 10, is displayed. In the example of FIG. 1, the secure visual data 12 is formed by an input frame of a personal code preceded by the words "ENTER PIN CODE". However, this will more typically by a random keyboard (or "scrambled" keyboard) of which the random arrangement will be known only by the secure components.

In many cases display subsystem 5 uses one or several memory zones. This entails in particular frame buffers. Frame buffers are memory zones wherein are stored, pixel by pixel, information that forms images to be displayed on the screen 2. They are able to be located in the memory 7, or at another physical location in the telephone 1, for example a physical location separate from this memory 7. However, these memory zones of frame buffers are here considered as being part of the memory 7, but also of the display subsystem 5 as well as of the means for communicating 9 between the two. There is therefore an overlapping of the various notions. Certain display commands as such consist for the central processing unit 8 in describing the screen to be displayed in the memory zone of the frame buffer provided for this purpose. This is the memory zone of the main frame buffer, a part of the display subsystem. A way of implementing the invention therefore consists in reserving a separate frame buffer memory zone for security. This is then a security frame buffer considered as part of the security processor 10. This in particular greatly facilitates the task of this processor 10.

Generally, it may occur that a display command coming from the central unit 8, non-secure, can potentially compromise the integrity or the security of the secure display, risking a modification of the secure display. In this case, it is up to the security processor 10 to detect and react to this situation, for example, by exiting the secure display mode, or by blocking the command at fault. In the example embodiment given hereinabove according to which a security frame buffer memory zone is used, this reverts in particular to verifying that no one other than the security processor 10 writes in this zone, and that no one other than the security processor 10 and display subsystem 5 reads in the zone.

In this case of implementation, it is further considered that the main frame buffer is part of the display subsystem, and that the security frame buffer is part of the security processor. As such the updates of the main frame buffer will be considered as display commands that are inoffensive for security, while the updates of the security frame buffer must be carried out only by the security processor. This buffer will form to a certain extent a portion of the internal state of this security processor. An attempt to update the security frame buffer by the central processing unit or any component other than the security processor 10 will typically be considered as an illegitimate security command to which the security processor 10 must react. The work of filtering of the security processor 10 will typically be done by monitoring the bus that here will serve in particular as a means of communication between the main processor, the memory, the security processor, more generally display subsystem. The bus will also be used as an internal means of communication of the display subsystem, i.e. between the main frame buffer and the other components of the display subsystem 5.

For the securing of the display of a smartphone or of a tablet according to the invention, we proceed according to the steps presented hereinafter with regards to the various examples.

In a first example, a user wants to execute an application in a security environment, in particular a banking application. For this, he uses an application recorded in the memory 7 of his portable telephone terminal, here a smartphone, in order to carry out a financial transaction. This application, that is stored and/or executes on a component that is not trustworthy, is present only for executing operations that are not critical for the security of the banking application. This is for example commanding the launching of the corresponding banking application which is executed on a secure bank server or on a local chip card, the sending of the transaction information to be validated, etc.

To this effect, the user clicks a suitable icon of the local application, appearing on the screen 2. The execution command of the application is taken into account by the central processing unit 8. For the execution of this application, the processing unit 8 controls for example a connection to a remote server connected to the terminal by a telecommunication network for example of the GSM type. In the unfolding of the execution of the application, the application and/or the remote server controls the display of a window for the entering, by the user, of a secret code which makes it possible to authenticate the user or validate the transaction.

The processing unit 8 transmits this display command to the display subsystem 5, for the display of a corresponding window to the screen 2. The security processor 10 filters this display command, and interprets it as a security command that is to be used for a secure display. It requires that the command comply with security policies. The processing unit 8 can in a more adapted version send this security command directly to the security processor 10 so that it processes it.

In order to carry out this security display the security processor 10 takes control of the display system 5, which will lead for example the secure processor in the embodiment based on a secure frame buffer, to build in this secure frame buffer the random virtual keyboard of which the characteristics will have been sent by the server in a confidential and encrypted manner in one of the commands intended for the security processor, and that the main processor will transmit without understanding them, then prompt the display subsystem to display the secure frame buffer once it is constituted. The central processing unit 8 is no longer involved in the display. If the central unit attempts during the secure display to send a non-secure command that can corrupt or threaten the secure display, for example attempting to recover or modify the secure data displayed on the screen, if the core running on the processor is corrupt, the security processor must intervene either for example to block the command, or to stop the secure display in such a way as to guarantee at all times the integrity and the correct detecting of the security display, i.e. the display of the means of recognition.

The security processor 10 verifies that the security commands, as well as the content of the security information that it displays, are intact and/or authentic.

As soon as a secure display is ready, and an authentic display request is made through a suitable security command requested by the server in the example under consideration, the security processor 10 triggers a secure display of the secure data. In other words, it triggers the secure display mode of the secure data. It sends a command or several commands for this purpose to the display system 5, for example the changing of the register pointing to the frame buffer. The central processing unit 8 also does not intervene in this step of the method other than as a relay or for accessorial tasks that do not impact the security of the transaction and also no longer intervene in the display in the following steps, as long as the secure mode is triggered.

The characteristic screen of the secure display mode is displayed for example superimposed on the conventional screen, or in a window superimposed on the latter. The security processor 10 controls the display of means for visual recognition 11. The command is received by the display system, in practice the display subsystem 5, which itself controls the display of the means for recognition on the screen 2. The means for recognition 11 is displayed on the screen 2 and the user of the terminal understands in a non-ambiguous manner, by viewing this means of recognition, that the secure display mode is triggered.

The remote server for example prompts for the input of a PIN Code by the user. This request is received by the security processor 10 which executes it by prompting the display subsystem 5, to display the input window for the PIN Code, which it will for example present by building and managing a random keyboard. The central processing unit 8 still does not intervene for the display. The display subsystem 5 displays the entry window for the PIN Code on the screen 2.

The user then enters his PIN Code into the secure input window of the secure data, for example using the random-key keyboard. When the keyboard has random keys, entering the key of the keyboard can be carried out by the central processing unit 8 without there being a need to trust it, as it will not know the correspondence between the keys and their values. Only the security processor 10 and/or the application on the server will know them and will be able to translate the input sequence of the PIN code. The key-entry itself of the code can be carried out in a trustworthy environment. The authentication of the user will be done without it being necessary to trust the central processing unit or the applications that it hosts.

Once the user is authenticated, an electronic transaction of a financial nature can be initiated, in the secure display mode. Here too, the central processing unit 8 is not part of the trusted space. The display is controlled solely by the security processor 10 which cooperated with the display subsystem 5. All of the security commands sent to the security processor 10 are for example verified, signed and even encrypted.

The authenticity and the integrity of all of the data displayed in the secure display mode is verified by the security processor 10.

If the telephone 1 comprises a code that is not trustworthy, for example a malicious code, that is taking advantage of a flaw in the operating system of the terminal. Then, this flaw intervenes on the display commands transmitted by the central processing unit 8 to the display subsystem 5. This malicious code will no longer be able to intervene on the display in the secure display mode of the secure data, because, effectively, the central processing unit 8 does not intervene or solely for tasks that do not require any trust and, if it attempts for example to build false security commands, the security processor 10 will detect the non-validity thereof.

The system according to the invention is as such secure.

To exit the secure display mode, the user, for example, actuates the button 4. The display is then reset under the control of the security processor 10.

The invention claimed is:

1. A secure smartphone or tablet comprising:
a screen for the displaying of visual data;
a display subsystem for controlling the displaying of visual data on the screen;
a central processing unit for carrying out executable program instructions and sending display commands to the display subsystem, wherein the display commands sent by the central processing unit to the display subsystem include security commands;
a communication device connecting the central processing unit to the display subsystem;
a security processor for interpreting and/or processing security commands for a secure display of secure visual data on the screen, the security processor filtering display commands sent by the central processing unit and intended to be processed by the display subsystem, wherein, in the filtering, the security processor identifies the security commands among the display commands and, upon receipt of a security command, triggers a secure display mode of the display subsystem, wherein, in the secure display mode of the display subsystem, the displaying, of visual data on the screen is controlled by the security processor without intervention from the central processing unit; and
a means for recognizing, by a user of the smartphone or tablet, a secure mode for displaying the secure visual data when the secure visual data, the displaying of which is controlled by the security processor, is displayed,
wherein the display subsystem comprises at least one main frame buffer and the security processor comprises a security frame buffer,
wherein the security processor is the only one to write in the security frame buffer, and wherein, during the secure display mode, the security processor filters the commands sent to the display subsystem by the central processing unit,
wherein a virtual keyboard display is stored in a buffer memory controlled by the security processor without intervention from the central processing unit and displayed in the secure displaymode, wherein the virtual keyboard display is adapted for receiving input from the user,
wherein key entries by the virtual keyboard display are carried out by the central processing unit and translated by the security processor,
wherein the security commands sent to the security processor are at least one selected from the group consisting of (i) encrypted or scrambled commands that guarantee the confidentiality of the secure visual data displayed, and (ii) signed commands that guarantee the integrity and/or the authentication of the secure data displayed.

2. The smartphone or tablet according to claim 1, wherein the security processor interprets and/or processes the security commands and controls the display of secure visual data in the secure mode for displaying the secure visual data.

3. The smartphone or tablet according to claim 1, wherein the security commands sent to the security processor are signed commands, which guarantee the integrity and/or the authentication of the secure data displayed.

4. The smartphone or tablet according to claim 1, wherein the security commands sent to the security processor are encrypted or scrambled commands that guarantee the confidentiality of the secure data displayed.

5. The smartphone or tablet according to claim 1, wherein the security processor manages several security areas, as well as the corresponding means of visual recognition.

6. The smartphone or tablet according to claim 1, wherein the means of recognition is a means for visual recognition displayed on the screen.

7. The smartphone or tablet according to claim 2, wherein the security commands sent to the security processor are signed commands, which guarantee the integrity and/or the authentication of the secure data displayed.

8. The smartphone or tablet according to claim 2, wherein the security commands sent to the security processor are encrypted or scrambled commands that guarantee the confidentiality of the secure data displayed.

9. The smartphone or tablet according to claim 3, wherein the security commands sent to the security processor are encrypted or scrambled commands that guarantee the confidentiality of the secure data displayed.

10. The smartphone or tablet according to claim 2, wherein the security processor manages several security areas, as well as the corresponding means of visual recognition.

11. The secure smartphone or tablet according to claim 1, wherein the secure display mode is displayed in a window superimposed on the conventional screen.

12. The secure smartphone or tablet according to claim 1, wherein the security processor is integrated into the display subsystem.

13. The secure smartphone or tablet according to claim 1, wherein, if a risk of modification of the secure display by a command from the central processing unit to the display subsystem is detected by the security processor, the command from the central processing unit is blocked or the secure mode is exited.

14. The secure smartphone or tablet according to claim 1, wherein the keyboard is a random-key keyboard.

15. A method for securing the display of visual data by means of a smartphone or,
wherein the smartphone or tablet comprises:

a screen for the displaying of visual data;

a display subsystem for controlling the displaying of visual data on the screen;

a central processing unit for carrying out executable program instructions and sending display commands to the display subsystem, wherein the display commands sent by the central processing unit to the display subsystem include security commands;

a communication device connecting the central processing unit to the display subsystem;

a security processor for interpreting and/or processing security commands for a secure display of secure visual data on the screen, the security processor filtering display commands sent by the central processing unit and intended to be processed by the display subsystem, wherein, in the filtering, the security processor identifies the security commands among the display commands and, upon receipt of a security command, triggers a secure display mode of the display subsystem, wherein, in the secure display mode of the display subsystem, the displaying of visual data on the screen is controlled by the security processor without intervention from the central processing unit; and a means for recognizing, by a user of the smartphone or tablet, a secure mode for displaying the secure visual data when the secure visual data, the displaying of which is controlled by the security processor, is displayed, wherein the display subsystem comprises at least one main frame buffer and the security processor comprises a security frame buffer, wherein the security processor is the only one to write in the security frame buffer, and wherein, during the secure display mode, the security processor filters the commands sent to the display subsystem by the central processing unit, wherein a virtual keyboard display is stored in a buffer memory controlled by the security processor without intervention from the central processing unit and displayed in the secure display mode, wherein the virtual keyboard display is adapted for receiving input from the user, wherein key entries by the virtual keyboard display are carried out by the central processing unit and translated by the security processor, wherein the method comprises:

by the central processing unit, processing executable program instructions and sending display commands to the display subsystem by the communication device connecting the central processing unit to the display subsystem;

by the security processor, filtering the display commands sent to the display subsystem by the central processing unit;

by the security processor, controlling the secure display of the secure data; and by the security processor, controlling the means of recognition of the secure mode for displaying the secure visual data, and by the security processor, during the secure display mode, filtering the commands sent to the display subsystem by the central processing unit, wherein the security commands sent to the security processor are at least one selected from the group consisting of (i) encrypted or scrambled commands that guarantee the confidentiality of the secure visual data displayed, and (ii) signed commands that guarantee the integrity and/or the authentication of the secure data displayed.

16. The method according to claim 15, wherein the security commands are signed, guaranteeing the integrity and/or the authentication of the secure data displayed.

17. The method according to claim 15, wherein the security commands are scrambled or encrypted, guaranteeing the confidentiality of the data displayed.

18. The method according to claim 15, wherein the security processor manages several security areas, as well as the corresponding means of visual recognition.

19. The method according to claim 15, wherein the means of recognition is a means for visual recognition displayed on the screen.

20. The method according to claim 15, wherein, if a risk of modification of the secure display by a command from the central processing unit to the display subsystem is detected by the security processor, the command from the central processing unit is blocked or the secure mode is exited.

21. The method according to claim 16, wherein the security commands are scrambled or encrypted, guaranteeing the confidentiality of the data displayed.

22. The method according to claim 16, wherein the security processor manages several security areas, as well as the corresponding means of visual recognition.

23. The method according to claim 17, wherein the security processor manages several security areas, as well as the corresponding means of visual recognition.

24. The method according to claim 15, wherein the keyboard is a random-key keyboard.

\* \* \* \* \*